(12) United States Patent
Bueno

(10) Patent No.: US 11,997,210 B2
(45) Date of Patent: *May 28, 2024

(54) PROTECTION OF ONLINE APPLICATIONS AND WEBPAGES USING A BLOCKCHAIN

(71) Applicant: ORACLE INTERNATIONAL CORPORATION, Redwood Shores, CA (US)

(72) Inventor: Rafael de Castro Bueno, Saskatoon (CA)

(73) Assignee: Oracle International Corporation, Redwood Shores, CA (US)

( * ) Notice: Subject to any disclaimer, the term of this patent is extended or adjusted under 35 U.S.C. 154(b) by 265 days.

This patent is subject to a terminal disclaimer.

(21) Appl. No.: 17/465,036

(22) Filed: Sep. 2, 2021

(65) Prior Publication Data
US 2021/0399897 A1 Dec. 23, 2021

Related U.S. Application Data

(63) Continuation of application No. 16/426,340, filed on May 30, 2019, now Pat. No. 11,153,093.

(51) Int. Cl.
*H04L 9/32* (2006.01)
*H04L 9/40* (2022.01)
*H04L 9/00* (2022.01)

(52) U.S. Cl.
CPC .......... *H04L 9/3239* (2013.01); *H04L 63/123* (2013.01); *H04L 63/145* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 2003/0061487 A1* | 3/2003 | Angelo | G06F 21/6209 713/176 |
| 2018/0309581 A1* | 10/2018 | Butler | H04L 63/0861 |

(Continued)

FOREIGN PATENT DOCUMENTS

| | | |
|---|---|---|
| CN | 109 257 340 A | 1/2019 |
| KR | 101 892 537 B1 | 8/2018 |

OTHER PUBLICATIONS

Intellectual Property India, Examination Report issued in India Application No. 202147039833 dated Mar. 31, 2022 (5pgs).

(Continued)

*Primary Examiner* — William J. Goodchild
(74) *Attorney, Agent, or Firm* — Kraguljac Law Group, LLC

(57) ABSTRACT

Systems, methods, and other embodiments associated with protecting online content are described. In one embodiment, a method includes generating a hashed code, and generating an encrypted and signed hash. The method may also include transmitting the encrypted and signed hash and the domain to a blockchain, causing: the blockchain to request validation the encrypted and signed hash by a terminal associated with a registrar of the domain; and the terminal associated with the registrar to: (a) decrypt the encrypted and signed hash using the private key to obtain the hashed code, (b) attempt to validate an authenticity of the hashed code, and (c) control inclusion of the hashed code in a blockchain record based on a result of the attempt to validate the authenticity of the hashed code.

20 Claims, 6 Drawing Sheets

(56) References Cited

U.S. PATENT DOCUMENTS

2019/0065709 A1* 2/2019 Salomon ............... H04L 9/0643
2020/0021446 A1* 1/2020 Roennow .............. H04L 9/0819
2020/0099513 A1* 3/2020 Angelo .................. H04L 63/12

OTHER PUBLICATIONS

Wikipedia, IDN Homograph Attack, pp. 1-8, downloaded on Oct. 12, 2017 from: https://en.wikipedia.org/wiki/IDN_homograph_attack.
Wikipedia, Man-in-the-Middle Attack, pp. 1-6, downloaded on Oct. 12, 2017 from: https://en.wikipedia.org/wiki/Man-in-the-middle_attack.
Digital Asset Holdings, LLC, The Digital Asset Platform—Nontechnical White Paper, Digital Asset, Dec. 2016, pp. 1-29.
Patent Cooperation Treaty (PCT), International Search Report and Written Opinion issued in Intl. Appl. No. PCT/US2020/034837 (Intl. Filing Date May 28, 2020), dated Oct. 5, 2020 (11 pgs).

* cited by examiner

PROTECTION OF ONLINE APPLICATIONS AND WEBPAGES USING A BLOCKCHAIN

CROSS REFERENCE TO RELATED APPLICATION

This disclosure is a continuation of and claims the benefit of priority to U.S. patent application Ser. No. 16/426,340, entitled "Protection of Online Applications and Webpages Using a Blockchain," inventor Rafael de Castro Bueno, filed May 30, 2019, which is incorporated herein by reference in its entirety for all purposes.

BACKGROUND

Conventional approaches for protecting data communications from one peer to another involve the use of https protocol, which uses point to point encryption. This method only prevents data from being intercepted and interpreted while being transmitted between the sender and receiver. However, malicious parties have since resorted to other ways of directing users to malicious codes, such as directly tampering with the content of a website or application, or attempting a so-called "man-in-the middle" attack.

An example of tampering with the content of a website is the insertion of malicious code in the content of a website. An attacker can insert data logging features or other such content that can grant the attacker access to private information entered into a web browser application.

A man-in-the-middle attack, in contrast, can occur without modification of the content of the original website itself. Instead, an attacker covertly intercepts and alters a communication between computer terminals operated by users who mistakenly believe they are directly communicating with each other. As a specific example, a request to retrieve and display a desired website by a web browser application can be intercepted by an attacker. Instead of directing the web browser to the desired website, the attacker instead directs the web browser to a different website having an appearance similar to the desired website. The different website can include malicious code, possibly compromising the user's private information.

As another example of a man-in-the-middle attack, during active eavesdropping the attacker makes independent connections with the victims and relays messages between them to make them believe they are talking directly to each other over a private connection, when in fact the entire conversation is controlled by the attacker. The attacker intercepts all relevant messages passing between the two victims and injects new messages, or alters the messages sent by the parties to the conversation.

Existing attempts to prevent tampering involve performing regular back-ups of the code of a website. Warnings can be issued to the website administrator if any changes are made to the website. Another way to safeguard network-accessible content requires service providers and other entities to actively look for malicious content over the internet. If any such content is found, the service providers communicate with the administrator to notify the administrator of the possible presence of malicious content. This allows the administrator to restore the website, or otherwise remove any malicious content. Such existing measures, however, allow the malicious code to be accessed over the Internet or other network by unaware users. The result is that sensitive information of the users may possibly be compromised until corrective measures are implemented.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
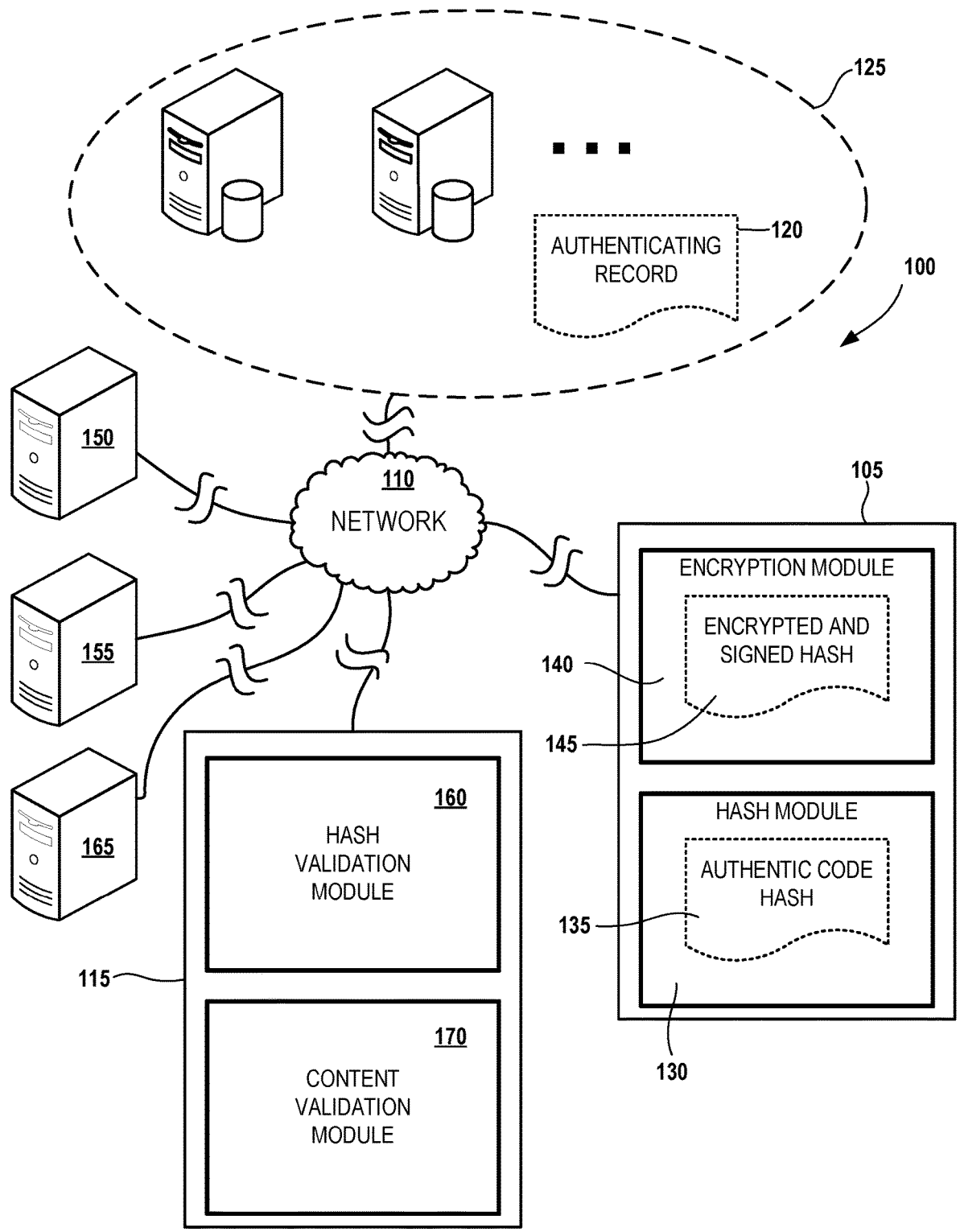
FIG. 1 illustrates one embodiment of a system associated with protecting a user computer from malicious code in website code.

Systems and methods are described herein that utilize distributed ledger technology, or "blockchain," to protect website code or other online applications that are accessible over a communication network. The present disclosure also describes systems and method that validate the authenticity or integrity of website code or other online applications when a user terminal attempts to open or otherwise access a desired online application.

The present systems and methods can interfere with the ability users to open websites or other online content with malicious code that was directly altered, or through the use of man-in-the-middle attacks. The ownership and/or the authenticity of the website or other online content can be validated before the content is opened. If the attempted validation fails, the present systems and methods interfere with the code being opened, executed or otherwise used by the user terminal to protect the user's information.

The present systems and methods may not prevent a network-accessible resource from being tampered with, or prevent a communication between computer terminals from being hijacked. However, the user's computer terminal can be protected against harm from opening or executing a maliciously-tampered-with website or other online resource. The user's computer terminal remains protected from being infected by such malicious code until a time when the online resource is restored and the malicious code neutralized. Thus, the user's computer terminal, and information of the end-user input thereto are protected, even when the code of a website or other online resource is tampered with to include malicious code. As a result, administrators are afforded adequate time to repair or otherwise restore the altered code to an authentic operational state (e.g., without the malicious code), without the malicious code becoming widespread.

For example, computer users are unable to control what happens to the code of websites or other online content they access over the Internet. Sometimes hackers can attempt to redirect all communications to a particular website by changing the hosts file for a computer. When a user of the affected computer types a URL into a web browser application, that user will be redirected to an unintended website, other than the actual website properly associated with the URL. The unintended website may resemble the actual website corresponding to the URL, making it difficult for the user to readily detect the misdirection.

The misdirection of websites requests is of particular concern for websites that utilize personal information of the user, such as a banking website. The unintended website can include login fields into which the user enters private information such as a username and password for accessing online financial information. Malicious measures such as data loggers and keystroke trackers allow wrongdoers to extract sensitive information (e.g., username, password, pin code, account number, and other sensitive information) entered into, or accessed by the affected terminal. Parties affiliated with the actual website can, as a result, incur losses as a result of brand discreditation or by taking financial accountability for damages caused by the malicious code.

The present disclosure involves the use of distributed ledger technology, often referred to as "Blockchain," to authenticate the ownership and integrity of website code before permitting the website code to be opened. Although website codes is used throughout the disclosure as an example of protected online content, the present technology can be utilized to protect against malicious content included in any network-accessible computer code.

Ownership and the authenticity of the website code is validated in response to transmission of a request by a user computer terminal to open a desired online application. The user computer is prevented from opening a website that includes malicious code that was directly injected or through a so-called "man-in-the-middle attack." If validation fails, the website code is prevented from being opened by the user computer, thereby protecting the user computer. Such protection will not prevent the website code from being tampered with or the communication from being hijacked. But the present technology will interfere with the user computer opening the malicious website, and help prevent the spread of the malicious code.

One aspect of the present technology is that the user computer is protected against a maliciously-altered website, affording administrators time to repair the website code and prevent the malicious code from spreading.

To protect website code according to the present disclosure, a website administrator includes an authenticating record for the authentic website code in the Blockchain. To accomplish this, a hash module of a computing device generates a hash of the authentic website code related to the website domain where the authentic website code will be hosted. The hash for the website code is encrypted and signed by an encryption module of the computing device utilizing: (i) a private key associated with the administrator, developer of the website code, or other authoritative party; and (ii) a public key associated with a registrar of the website domain.

The encrypted and signed version of the hash related to the website domain is transmitted to the Blockchain according to a smart contract. The smart contract includes rules defining terms to be satisfied for inclusion of an authenticating record that documents the authenticity of the website code in the Blockchain. Including the authenticating record in the Blockchain means that the authenticating record is stored by a non-transitory computer-readable medium of a computing device accessible over the Internet, such as a server or other network-connected computer terminal. The authenticating record is included in a series of related records resulting from derivations or other works or transactions involving the authenticating record.

The series of records are linked in a "chain," and are stored by a plurality of different network-connected computing devices, that reference the authenticating record. Even if one record in the series is corrupted, such corruption will create a discrepancy with the other records in the series, thereby indicating that the corrupted record or the corresponding website code may have been compromised. The network of connected computing devices storing the authenticating record and related records is referred to generally herein as the Blockchain.

Transmission of the encrypted and signed version of the hash to the Blockchain causes the Blockchain to execute a validation procedure. As part of the validation procedure, the Blockchain is requested in the smart contract to identify the registrar responsible for the website domain based on the public key of the registrar. Recall that the public key was used as part of the encryption and signature process performed by the encryption module above. Once the registrar is identified, the Blockchain is caused to request approval of the signature associated with the hash of the authentic website code from the registrar.

To approve the authenticating record for inclusion in the Blockchain, the registrar is requested in the smart contract to decrypt the hash using the private key associated with the authentic website code. The registrar analyzes the decrypted hash to determine if the signature matches the actual signature known to be associated with the owner of the website domain for hosting the authentic website code. If the hashed website code is not correctly encrypted, or the signature does not match that of the domain owner, entry of the authenticating record in the Blockchain rejected.

As a result of validation of the authenticity of the authenticating record by the registrar, notice of validation is transmitted to the blockchain. The notice of validation indicates that the authenticating record, and the unencrypted hash code of the website is valid, and should be included in the Blockchain. In response, and according to the smart contract, the Blockchain is caused to transmit a second request to an authoritative nameserver (e.g., a domain name server, or "DNS") for redundant validation of the authenticity of the website code.

The second request for redundant validation requests the DNS to determine if the registrar is indeed the designated registrar for the website domain listed in the smart contract for the website code being authenticated. If the DNS determines that the registrar is not the designated registrar for the website domain, redundant validation fails, and the DNS rejects the authenticating record inclusion in the Blockchain.

Once redundant validation is successfully completed (e.g., the registrar is determined by the DNS to be the designated registrar for the website domain), the DNS responds to the Blockchain with its approval of inclusion of the authenticating record in the Blockchain. In response to receiving the approval of the DNS, the Blockchain is caused to include the authenticating record, which can include the unencrypted hash of the website code and domain associated with the website code, as part of the distributed ledger maintained by the Blockchain. A notification confirming that the authenticating record has been approved for inclusion in the Blockchain can optionally be transmitted by the Blockchain to a user computer associated with a party associated with the website code.

The authenticating record, once included in the Blockchain, can be used to validate the authenticity and integrity of the website code at a time when attempt to open the website code is made. An attempt to "open" website code, as used herein, involves a request from a user computer to retrieve and display a website as a result of a user entering a URL into a browser field, or otherwise indicating a desire to display a website. Validating the authenticity and integrity of the website code is to be completed before the user computer is permitted to open the website code and display the website.

A web browser executed by the user computer can receive a request from a user to open website code and display a website. A hash validation module of the web browser, in response, transmits a request for a hash associated with website code over a communication network, such as the Internet, to a web server. Before transmitting the website code to the user computer to be opened, the web server is caused by the request to return a hash associated with the requested website code to the user computer.

The hash validation module uses the hash returned by the web server to determine if the returned hash has been validated and included in an authenticating record in the Blockchain and related to the domain of the website code, as described above. To accomplish this, the hash validation module transmits a confirmation request to the Blockchain. The confirmation request causes the Blockchain to return the hash related to the domain for the website code. If the hash validation module determines that the hash returned by the web server is not related to the domain of the website code to be opened, then hash validation is unsuccessful. As a result of unsuccessful hash validation, the hash validation module can issue a warning and interfere with retrieval and/or opening of the website code by the user computer from the web server.

If hash validation is successful (e.g., the hash returned by the web server included in an authenticating record in the Blockchain is related to the domain to be opened), a content validation module performs content validation. Content validation involves the content validation module transmitting a request for the website code over the Internet to the web server. The web server returns the website code to the user computer over the Internet in response to receiving the request. The content validation module compares: (i) the website code returned by the web server, to (ii) the hash related to the domain for the website code that was previously returned by the Blockchain to the hash validation module.

If the content validation module determines that the hash related to the domain in the authenticating record returned by the Blockchain does not correspond to the returned website code, the content validation module interferes with opening of the website code by the user computer. For example, the web browser can optionally display an alert to the user instead of opening the received website code and displaying the respective website.

If, however, the content validation module determines that the hash related to the domain in the authenticating record in the Blockchain corresponds to the returned website code, the content validation module validates the website code and causes the website code to be opened. As a result, the web browser application executed by the user computer generates a display including the website content.

With reference to FIG. 1, one embodiment of a system 100 associated with protecting a user computer from malicious code in a website is illustrated. The system includes an administrative terminal 105 operatively connected to a communication network 110 such as the Internet. The administrative terminal 105 is operable to control the establishment of ownership and authenticity of website code, allowing for reliable validation of the website code before the website code is permitted to be opened by a user terminal 115. Ownership and authenticity, once established by the administrative terminal, is documented in an authenticating record 120 included in the Blockchain 125.

The administrative terminal 105 can be operated by a party who is responsible for the website code (e.g., a developer), hosts the website code, or is otherwise involved with making the website code network accessible. The administrative terminal 105 includes a hash module 130 that hashes the authentic website code to generate a hashed code 135.

Hashing, as performed by the hash module 130, involves taking an input string of any length and generating an output string having a fixed length of characters. For example, the website code and domain corresponding to the website code can be considered an input to a hashing algorithm. Regardless of the size of the input, the output for each hash is equal.

The hashing algorithm utilized by the hash module 130 can optionally be deterministic. Thus, each time the same input (e.g., website code and corresponding domain) is processed according to the algorithm, the same hashed code 135 is output. However, the hashed code 135 can optionally be impractical to reverse (i.e., determine the content that was used as an input to the hash algorithm based on the output). Examples of hashing algorithms include, but are not limited to MD5, SHA-1, SHA256, SHA512, etc.

The administrative terminal 105 also includes an encryption module 140 that is operable to generate an encrypted and signed hash 145, based on the hashed code 135. A private key associated with a source (e.g., the software developer) of the website code, and a public key associated with a registrar of the domain where the website is to be hosted are used by the encryption module 140 to generate the encrypted and signed hash 145.

The administrative terminal 105 transmits the encrypted and signed hash 145 to the Blockchain 125, with a smart contract and a request to validate the encrypted and signed hash 145. As described in greater detail below, validation of the encrypted and signed hash 145 by the Blockchain 125 involves satisfying the rules included in the smart contract. For one embodiment, validation involves a multi-step validation process.

For example, as part of the validation procedure, the Blockchain 125 is requested in the smart contract to identify the registrar responsible for the website domain based on the public key of the registrar included with the encrypted and signed hash 145. Once the registrar is identified, the Blockchain 125 transmits the encrypted and signed hash 145 to a server 150 associated with the registrar, with a request to decrypt the encrypted and signed hash 145, and approve a signature associated with the encrypted and signed hash 145.

To approve the authenticating record 120 for inclusion in the Blockchain 125, the registrar server 150 is requested in the smart contract (or by the Blockchain 125 in accordance with the smart contract) to decrypt the hash using the registrar's private key. The private key corresponds to the public key included with the encrypted and signed hash 145. The registrar server 150 analyzes the now-decrypted hash to determine if the signature matches the actual signature known to be associated with the owner of the website domain for hosting the authentic website code. If the hashed website code is not correctly encrypted (e.g., can't be decrypted by the registrar server 150 using the registrar server's private key), or the signature does not match that of the domain owner, entry of the authenticating record 120 in the Blockchain 125 is rejected.

If the encrypted and signed hash 145 is properly encrypted, and the signature matches that of the owner of the domain, the registrar server 150 transmits notice of validation to the Blockchain 125. The registrar server 150 also decrypts the encrypted and signed hash 145, and transmits the decrypted hash to the Blockchain 125. The notice of validation indicates that the signature matches the registered owner of the domain associated with the website code, and that the authenticating record 120 associated with the website code should be included in the Blockchain 125.

As a result of receiving the notice of validation, and according to the smart contract, the Blockchain 125 transmits a second request to the DNS 155. The second request is for redundant validation of the authenticity of the website code.

The second request instructs the DNS 155 to determine if the registrar is indeed the designated registrar for the website domain listed in the decrypted hash for the website code being authenticated. If the DNS 155 determines that the registrar is not the designated registrar for the website domain, redundant validation fails, and the DNS 155 prevents the authenticating record 120 from being included in the Blockchain 125.

Once redundant validation is successfully completed (e.g., the registrar is determined by the DNS 155 to be the designated registrar for the website domain), the DNS 155 responds to the Blockchain 125, approving inclusion of the authenticating record 120 in the Blockchain 125.

In response to receiving the approval of the DNS 155, the authenticating record 120 is included in the Blockchain 125, optionally as an original node, starting a new chain for the website code. The authenticating record 120 can include the unencrypted hash of the website code and domain associated with the website code, as part of the distributed ledger maintained on the Blockchain 125. A notification confirming that the authenticating record 120 has been approved for inclusion in the Blockchain 125 can optionally be transmitted by the Blockchain 125 to the administrative terminal 105.

The user terminal 115 can access the authenticating record 120, once included in the Blockchain 125, to validate the authenticity and integrity of the website code before opening the website code. The user terminal 115 includes a hash validation module 160, which can form a component of a web browser application. As a result of a user inputting an instruction to open the website code into the user terminal 115, the hash validation module 160 requests a hash of the website from a web server 165 hosting the website code.

The web server 165 answers the request by transmitting the hash of the website back to the hash validation module 160. The returned hash of the website includes the hash of the website code, and the domain associated with the website. In turn, the hash validation module 160 validates authenticity of the received website hash with the Blockchain 125.

For example, the hash validation module 160 transmits the received hash of the website to the Blockchain 125. The Blockchain 125 determines whether the authenticating record 120 includes the hash of the website. If so, the Blockchain also determines whether the domain transmitted by the hash validation module 160 is related to the domain in the authenticating record 120. If so, then the Blockchain 125 transmits, to the user terminal 115, a validation notice such as the hash of the website related to the domain to be opened from the authenticating record 120. Because the authenticity and integrity of the authenticating record 120 has already been validated, the hash transmitted by the Blockchain corresponds to the website, without malicious code.

The user terminal 115 also includes a content validation module 170. Once the validation notice is received by the user terminal 115, the content validation module 170, which can also optionally form a component of the web browser application, requests the website code from the web server 165. Upon receiving the website code from the web server, the content validation module 170 compares the content of the website code to content represented by the hash received from the Blockchain 125. If the comparison results in a determination that the website code matches content based on the hash received from the Blockchain 125, the content validation module 170 concludes that the website code is safe to open. As a result, the content validation module 170 causes the web browser application to open the website code.

If the comparison results in a determination that the website code does not match content based on the hash received from the Blockchain 125, the content validation module 170 concludes that the website code is not safe to open. As a result, the content validation module 170 interferes with the ability of the web browser application to open the website code, thereby protecting the user terminal 115 from potentially-malicious code.

In one embodiment, one or more of the administrative terminal 105, user terminal 115, registrar terminal 150, DNS 155, and web server 165 (each of which generically referred to as a device) can be a computing/data processing system including an application or collection of distributed applications for enterprise organizations. The applications and device(s) may be configured to operate with or be implemented as a cloud-based networking system, a software as a service (SaaS) architecture, or other type of networked computing solution. In one embodiment the device(s) is/are a centralized server-side application that provides at least the functions disclosed herein and that is accessed by many users via computing devices/terminals communicating with the system 100 (functioning as the server) over a computer network.

Further, in one embodiment, one or more of the components described herein are configured as program modules stored in a non-transitory computer readable medium. The program modules are configured with stored instructions that when executed by at least a computer processor cause the computing device, such as computing device 500 described with reference to FIG. 5, to perform the corresponding function(s) as described herein. The functions/actions performed herein are performed, at least in part, by the processor accessing and interacting with a memory device to read/write data and values to and from the memory device. No functions/actions described or claimed herein are performed manually or in the human mind.

Figure 2:
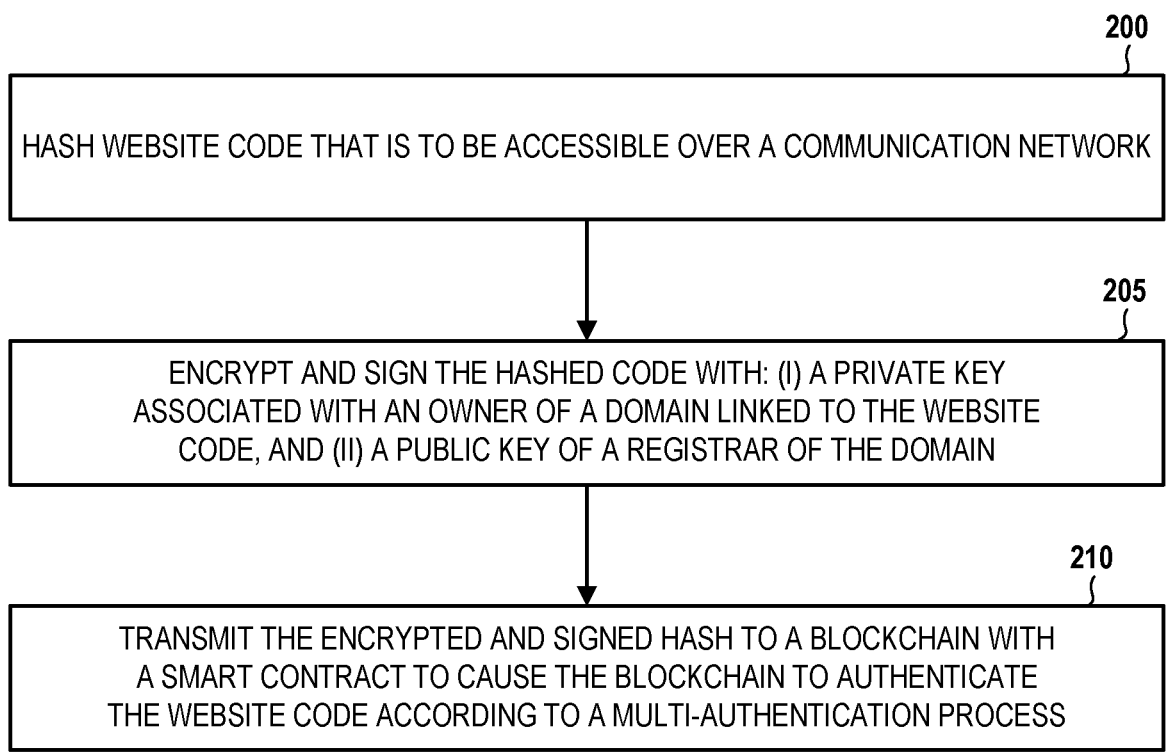
FIG. 2 is a flow diagram graphically depicting an illustrative method of validating an authenticity or integrity of website code in a Blockchain.

FIG. 2 is a flow diagram graphically depicting one embodiment of a method for establishing website code as authentic, and lacking malicious code using the Blockchain 125. The administrative terminal 105 hashes, at block 200, website code that is to be hosted at a network address for a domain registered to a party affiliated with the website code. The hash produces an output having a fixed length according to the specific hashing algorithm used.

The hashed code is encrypted and signed at block 205. The hashed code is encrypted and signed using: (i) a private key associated with a developer or other source of the website code, and (ii) a public key associated with a registrar of the domain. The private key allows the registrar server 150 to decrypt the encrypted and signed hash 145, and the public key of the registrar allows the Blockchain to identify the registrar server 150 to which the encrypted and signed hash 145 is to be transmitted.

The encrypted and signed hash 145 is transmitted over a communication network 110 to the Blockchain at block 210. A smart contract defining rules or terms for authenticating the website code in a form free from malicious code is transmitted with the encrypted and signed hash 145. The encrypted and signed hash 145 and smart contract cause the Blockchain 125 to execute a multi-step authentication process, as described with reference to FIG. 3, to include an authenticating record 120 for the website code in the Blockchain 125.

Figure 3:
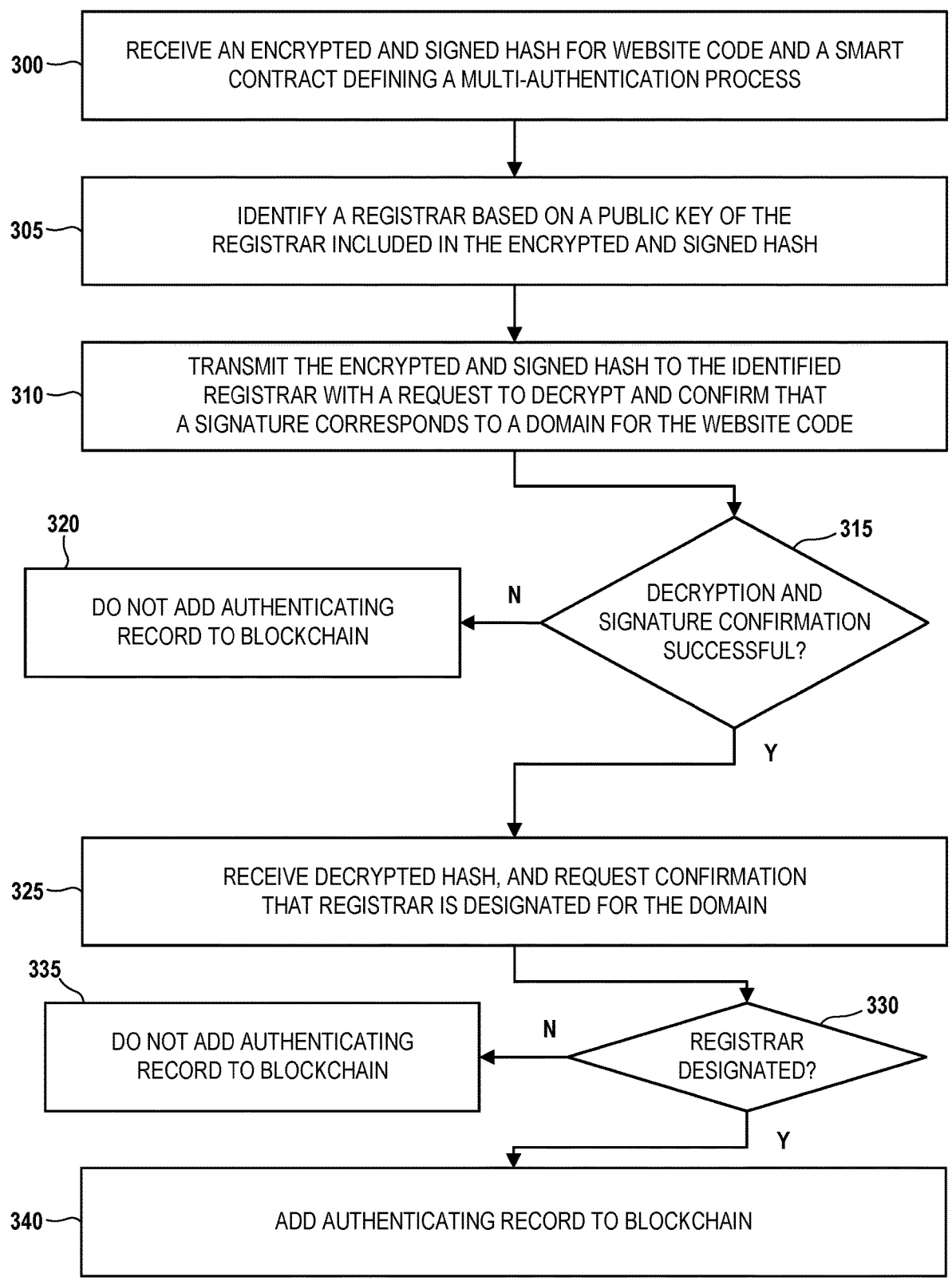
FIG. 3 is a flow diagram graphically depicting an illustrative method of a multi-authentication process performed by a Blockchain according to a smart contract.

FIG. 3 is a flow diagram graphically depicting one embodiment of a multi-step authentication method performed by the Blockchain 125 for establishing website code as authentic. The Blockchain receives the combination of the encrypted and signed hash 145 and smart contract over the communication network 110 at block 300. The smart contract defines the process described hereinafter for authenticating the website code.

The public key of the registrar included with the encrypted and signed hash 145 is used by the Blockchain 125 to route the encrypted and signed hash 145 to the appropriate registrar server 150 at block 305. Once the registrar server 150 is identified, the Blockchain 125 transmits the encrypted and signed hash 145 to the registrar server 150 at block 310. The transmission of the encrypted and signed hash 145 includes a request for the registrar server 150 to decrypt the encrypted and signed hash 145. Confirmation by the registrar server 150 that the signature of the developer or other party affiliated with the website code corresponds to a domain for the website code is also requested.

The registrar server 150, after attempting to decrypt and confirm the signature of the encrypted and signed hash 145 as described below with reference to FIG. 4, returns the results of the attempt to the Blockchain 125. The Blockchain 125 determines, at block 315, whether the decryption and signature confirmation attempt by the registrar server 150 was successful. If not, then the authenticating record 120 is prevented from being added to the Blockchain 125 at block 320. If so, the Blockchain continues with the multi-step authentication process by requesting confirmation from the DNS 155 that the registrar is designated for the domain associated with the website code at block 325. The decrypted hash is also returned by the registrar server 150 to the Blockchain 125.

If, at block 330, the Blockchain 125 determines that the DNS 155 fails to indicate that the registrar is designated for the domain associated with the website code, then the Blockchain 125 prevents addition of the authenticating record 120 to the Blockchain 125 at block 335. If the Blockchain 125 determines that the DNS 155 determined that the registrar is designated for the domain associated with the website code, then the Blockchain 125 adds the authenticating record 120 to the Blockchain 125 at block 340.

Figure 4:
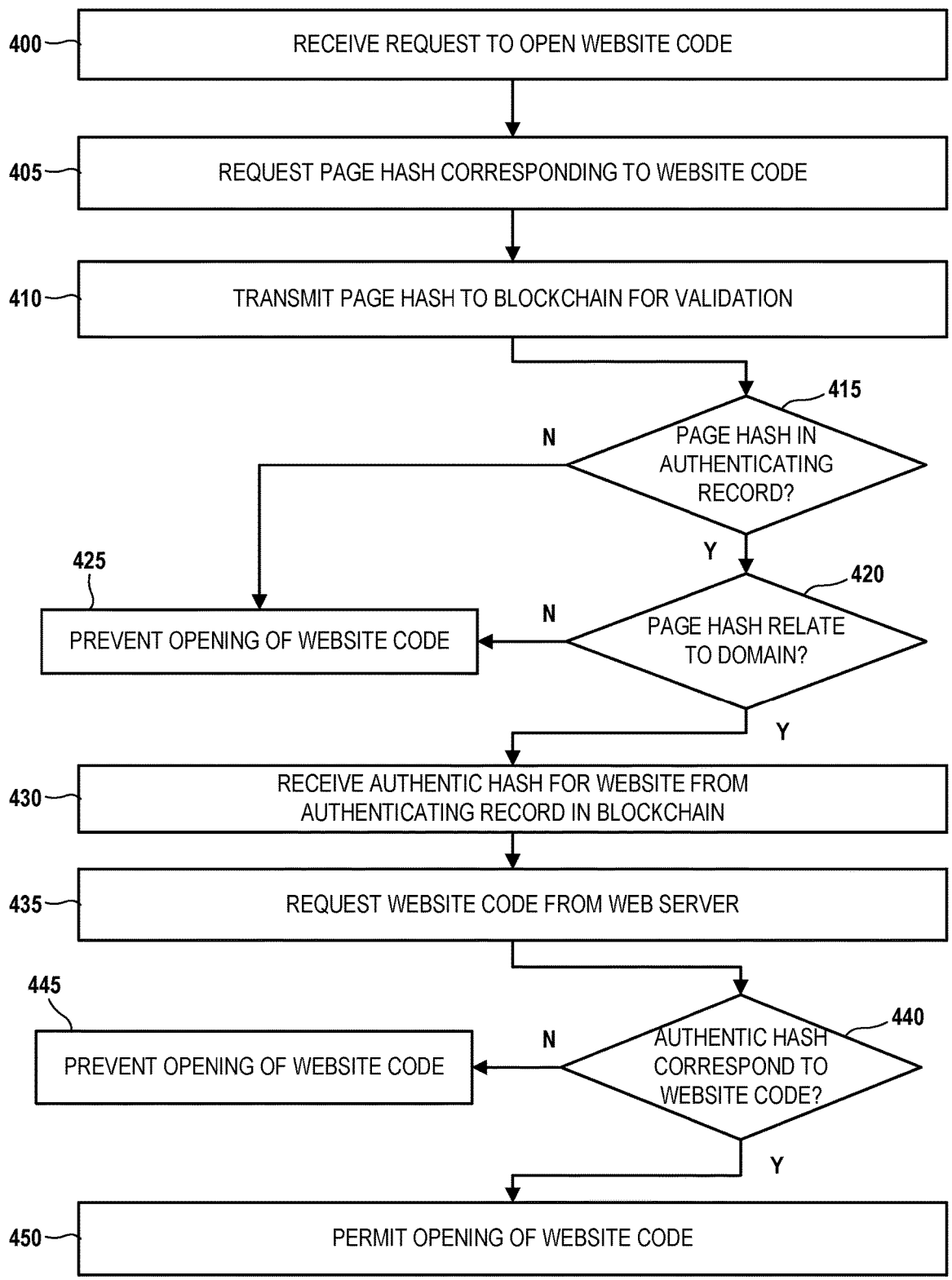
FIG. 4 is a flow diagram graphically depicting an illustrative method of opening website code once the website code is confirmed to be authentic and free of malicious code using a Blockchain.

FIG. 4 is a flow diagram graphically depicting one embodiment of a method of opening website code once the website code has been determined to be authentic and free of malicious code using a Blockchain 125. The web browser receives a request to open the website code at block 400. The request can be received in response to entry of a URL or network address into an address field of a user interface generated as a result of execution of the web browser.

Rather than immediately requesting and opening the website code, the hash validation module 160 requests a page hash corresponding to the website code from the web server 165, at block 405. The page hash is transmitted to the Blockchain 125 by the hash validation module 160 at block 410, for validation based on the authenticating record 120.

The Blockchain 125 is caused to determine at block 415 whether the page hash is included in the authenticating record 120 and, if so, whether the page hash relates to the domain of the website code at block 420. If the determination at either block 415 or block 420 is negative, the communication received from the Blockchain 125 at the hash validation module 160 prevents the web browser application from opening the website code at block 425. Otherwise, the Blockchain 125 returns authentic page hash corresponding to the website code from the authenticating record 120 at block 430.

The content validation module 170 subsequently requests the website code from the web server 165 at block 435. The content validation module 170 determines, at block 440, whether the authentic page hash from the authenticating record 120 in the Blockchain 125 corresponds to the website code received from the web server 165. If not, the content validation module 170 prevents the web browser from opening the website content at block 445. Otherwise, the content validation module 170 permits the web browser application to open the website content at block 450.

Computing Device Embodiments

Figure 5:
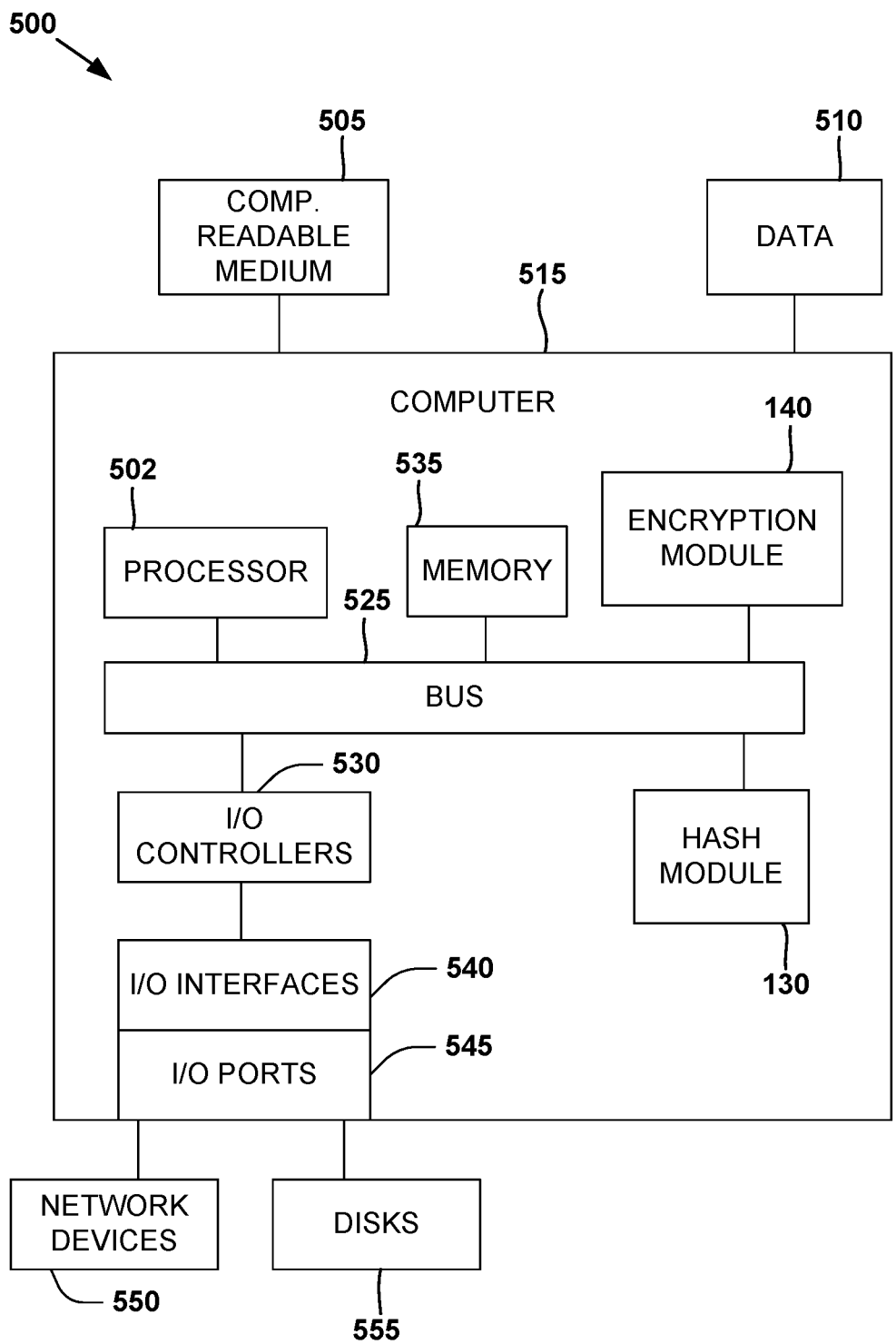
FIG. 5 illustrates an embodiment of a computing system configured with the example systems and/or methods disclosed.
Figure 6:
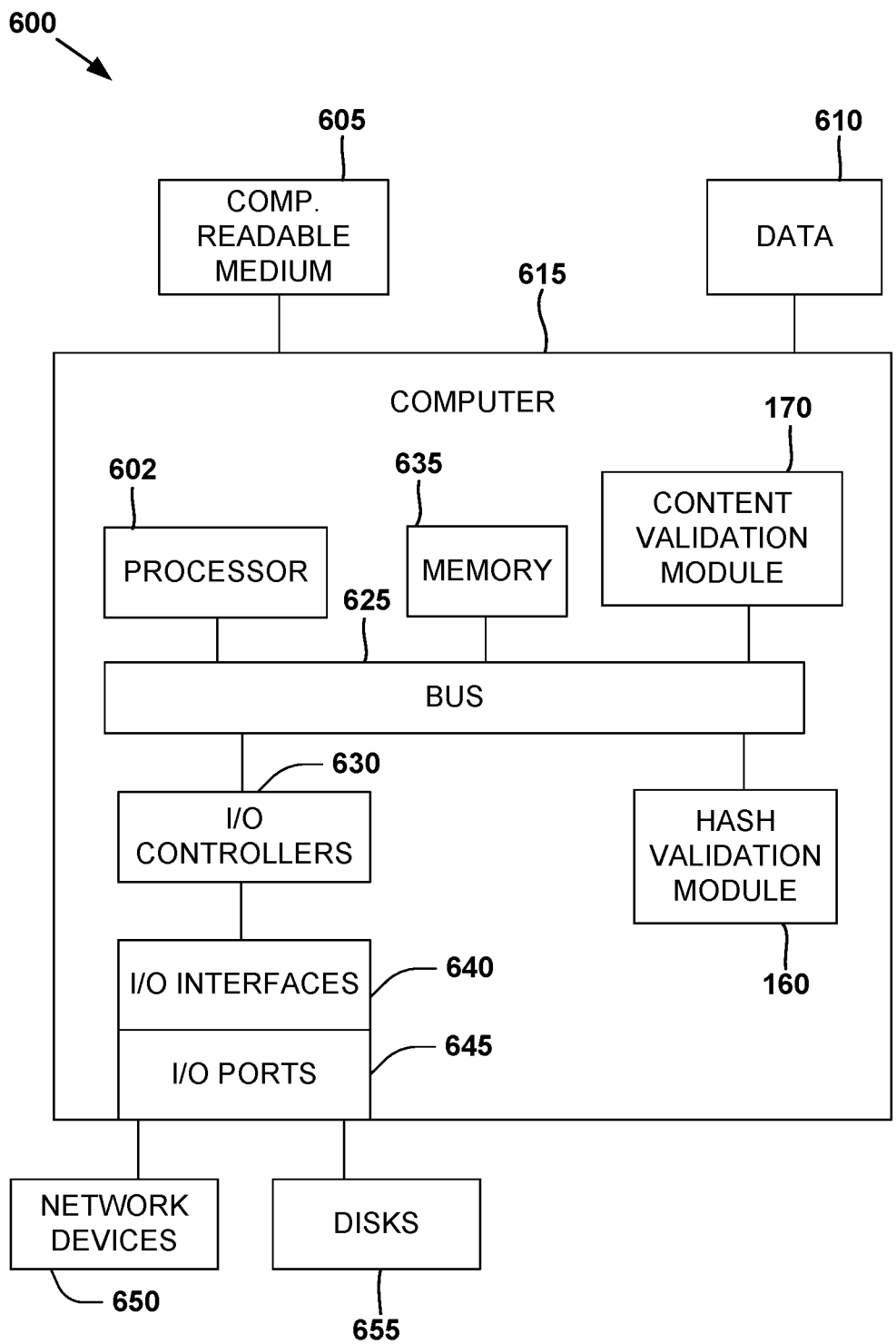
FIG. 6 illustrates another embodiment of a computing system configured with the example systems and/or methods disclosed

FIGS. 5 and 6 illustrate examples computing devices 500 and 600 that are configured and/or programmed with one or more of the example systems and methods described herein, and/or equivalents. As shown in FIG. 5, the example computing device 500 may be a computer 515 that includes a processor 502, a memory 535, and input/output ports 545 operably connected by a bus 525. In one example, the computer 515 may include logic for a hash module 130 and an encryption module 140 configured to facilitate hashing and encryption of website code as described herein. In different examples, the logic may be implemented in hardware, a non-transitory computer-readable medium with stored instructions, firmware, and/or combinations thereof. While the logic for the hash module 130 and encryption module 140 is illustrated as hardware components attached to the bus 525, it is to be appreciated that in other embodiments, the logic could be implemented in the processor 502, stored in memory 535, or stored in disk 555 or other non-transitory, computer-readable medium 505.

In one embodiment, logic or the computer 515 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to hash and/or encrypt website code as described herein. The means may also be implemented as stored computer executable instructions that are presented to computer 515 as data 510 that are temporarily stored in memory 535 and then executed by processor 502.

Logic may also provide means (e.g., hardware, non-transitory computer-readable medium that stores executable instructions, firmware) for performing the hashing and encrypting methods described herein.

Generally describing an example configuration of the computer 515, the processor 502 may be a variety of various processors including dual microprocessor and other multi-processor architectures. A memory 535 may include volatile memory and/or non-volatile memory. Non-volatile memory may include, for example, ROM, PROM, and so on. Volatile memory may include, for example, RAM, SRAM, DRAM, and so on.

A storage disk 555 may be operably connected to the computer 515 via, for example, an input/output (I/O) interface (e.g., card, device) 540, an I/O controller 530, and an input/output port 545 that are controlled by at least input/output (I/O) controller 530. The disk 555 may be, for example, a magnetic disk drive, a solid-state disk drive, a floppy disk drive, a tape drive, a Zip drive, a flash memory card, a memory stick, and so on. Furthermore, the disk 555 may be a CD-ROM drive, a CD-R drive, a CD-RW drive, a DVD ROM, and so on. The memory 535 can store a process and/or a data 510, for example. The disk 555 and/or the memory 535 can store an operating system that controls and allocates resources of the computer 515.

The computer 515 may interact with input/output (I/O) devices via the input/output (I/O) controller 530, the I/O interfaces 540 and the input/output ports 545. Input/output devices may be, for example, a keyboard, a microphone, a pointing and selection device, cameras, video cards, displays, the disk 555, the network devices 550, and so on. The input/output ports 545 may include, for example, serial ports, parallel ports, and USB ports.

The computer 515 can operate in a network environment and thus may be connected to the network devices 550 via the I/O interfaces 540, and/or the I/O ports 545. Through the network devices 550, the computer 515 may interact with a communication network. Through the network, the computer 515 may be logically connected to remote computers. Networks with which the computer 515 may interact include, but are not limited to, a LAN, a WAN, and other networks.

As shown in FIG. 6, the example computing device 600 may be a computer 615 that includes a processor 602, a memory 635, and input/output ports 645 operably connected by a bus 625. In one example, the computer 615 may include logic for a hash validation module 160 and content validation module 170 configured to facilitate validation of the authenticity of website code, before opening such website code, as described herein. In different examples, the logic may be implemented in hardware, a non-transitory computer-readable medium with stored instructions, firmware, and/or combinations thereof. While the logic for the hash validation module 160 and content validation module 170 is illustrated as hardware components attached to the bus 625, it is to be appreciated that in other embodiments, the logic could be implemented in the processor 602, stored in memory 635, or stored in disk 655 or other non-transitory, computer-readable medium 605.

In one embodiment, logic or the computer 615 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to hash and/or encrypt website code as described herein. The means may also be implemented as stored computer executable instructions that are presented to computer 615 as data 610 that are temporarily stored in memory 635 and then executed by processor 602.

Logic may also provide means (e.g., hardware, non-transitory computer-readable medium that stores executable instructions, firmware) for performing the website authenticity confirmation methods described herein.

Generally describing an example configuration of the computer 615, the processor 602 may be a variety of various processors including dual microprocessor and other multi-processor architectures. A memory 635 may include volatile memory and/or non-volatile memory. Non-volatile memory may include, for example, ROM, PROM, and so on. Volatile memory may include, for example, RAM, SRAM, DRAM, and so on.

A storage disk 655 may be operably connected to the computer 615 via, for example, an input/output (I/O) interface (e.g., card, device) 640, an I/O controller 630, and an input/output port 645 that are controlled by at least input/output (I/O) controller 630. The disk 655 may be, for example, a magnetic disk drive, a solid-state disk drive, a floppy disk drive, a tape drive, a Zip drive, a flash memory card, a memory stick, and so on. Furthermore, the disk 655 may be a CD-ROM drive, a CD-R drive, a CD-RW drive, a DVD ROM, and so on. The memory 635 can store a process and/or a data 610, for example. The disk 655 and/or the memory 635 can store an operating system that controls and allocates resources of the computer 615.

The computer 615 may interact with input/output (I/O) devices via the input/output (I/O) controller 630, the I/O interfaces 640 and the input/output ports 645. Input/output devices may be, for example, a keyboard, a microphone, a pointing and selection device, cameras, video cards, displays, the disk 655, the network devices 650, and so on. The input/output ports 645 may include, for example, serial ports, parallel ports, and USB ports.

The computer 615 can operate in a network environment and thus may be connected to the network devices 650 via the I/O interfaces 640, and/or the I/O ports 645. Through the network devices 650, the computer 615 may interact with a communication network. Through the network, the computer 615 may be logically connected to remote computers. Networks with which the computer 615 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
SQL: structured query language.
OQL: object query language.
USB: universal serial bus.
XML: extensible markup language.
WAN: wide area network.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

No action or function described or claimed herein is performed by the human mind. An interpretation that any action or function can be performed in the human mind is inconsistent and contrary to this disclosure.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that, when executed by at least one processor of a computing system, cause the computing system to:
    hash, by at least the processor, computer code corresponding to network-accessible content to generate a hashed code, wherein the network-accessible content is to be hosted at a network address corresponding to a domain;
    encrypt and sign, by at least the processor, the hashed code to generate an encrypted and signed hash, wherein the hashed code is encrypted using: (i) a private key associated with a source of the network-accessible content, and (ii) a public key associated with a registrar of the domain;
    transmit, by at least the processor, the encrypted and signed hash and the domain to a blockchain, wherein the instructions comprise further instructions that, when executed by at least the processor, cause:
        (i) the blockchain to request validation of the encrypted and signed hash by a terminal associated with a registrar of the domain; and
        (ii) the terminal associated with the registrar to: (a) decrypt the encrypted and signed hash using the private key to obtain the hashed code, (b) attempt to validate an authenticity of the hashed code, and (c) control inclusion of the hashed code in a blockchain record based on a result of the attempt to validate the authenticity of the hashed code; and
    in response to a user terminal attempting to access the network-accessible content at the network address, before opening the network-accessible content in the user terminal,
        generate, by a web server hosting the network-accessible content at the network address, a second hashed code of the network-accessible content,
        attempt to validate the second hashed code against the hashed code in the blockchain record, and
        control opening the network accessible content in the user terminal based on a result of the attempt to validate the second hashed code.

2. The non-transitory computer-readable medium of claim 1, wherein the instructions, when executed by at least the processor, further cause:
    the terminal associated with the registrar to control inclusion of the hashed code in the blockchain record by transmitting the hashed code to the blockchain if the attempt to validate the authenticity of the hashed code results in a determination that the hashed code is authentic;
    the blockchain to transmit a domain confirmation request to a domain name server; and
    the domain name server to: (i) determine whether the registrar matches a specific registrar linked to the domain in a data structure accessible to the domain name server, (ii) transmit an approval to the blockchain, to cause the hashed code to be included in the blockchain record as a result of a match between the registrar and the specific registrar, and (iii) transmit an objection to the blockchain, to interfere with inclusion of the hashed code in the blockchain record as a result of a determination that the registrar does not match the specific registrar.

3. The non-transitory computer-readable medium of claim 2, further comprising instructions that, when executed by at least the processor, cause the computing system to:
    receive, by at least the processor, notification that the hashed code has been validated for inclusion in the blockchain record as a result of the match between the registrar and the specific registrar.

4. The non-transitory computer-readable medium of claim 1, wherein the instructions, when executed, cause the terminal associated with the registrar to attempt to validate the authenticity of the hashed code by determining whether a signature of the encrypted and signed hash corresponds to a party affiliated with the domain.

5. The non-transitory computer-readable medium of claim 1, wherein the instructions, when executed, cause the terminal associated with the registrar to interfere with inclusion of the hashed code in the blockchain record if the attempt to validate the authenticity of the hashed code fails, and the hashed code is not validated as being authentic.

6. The non-transitory computer-readable medium of claim 5, wherein the hashed code is not validated if an encryption of the encrypted and signed hash is improper.

7. The non-transitory computer-readable medium of claim 5, wherein the hashed code is not validated if a signature provided to the encrypted and signed hash is not a signature corresponding to a party affiliated with the domain.

8. A computing system, comprising:
    at least one processor connected to at least one memory;
    a hash module stored on one or more non-transitory computer readable media and including instructions that when executed by at least the processor cause the processor to hash computer code corresponding to network-accessible content to generate a hashed code, wherein the network-accessible content is to be hosted at a network address corresponding to a domain;

an encryption module stored on the one or more non-transitory computer readable media and including instructions that when executed by at least the processor cause the processor to:
  encrypt and sign the hashed code to generate an encrypted and signed hash, wherein the hashed code is encrypted using: (i) a private key associated with a source of the network-accessible content, and (ii) a public key associated with a registrar of the domain; and
  transmit, by at least the processor, the encrypted and signed hash and the domain to a blockchain, causing:
    (i) the blockchain to request validation the encrypted and signed hash by a terminal associated with a registrar of the domain; and
    (ii) the terminal associated with the registrar to: (a) decrypt the encrypted and signed hash using the private key to obtain the hashed code, (b) attempt to validate an authenticity of the hashed code, and (c) control inclusion of the hashed code in a blockchain record based on a result of the attempt to validate the authenticity of the hashed code;
a hash validation module stored on the one or more non-transitory computer readable media and including instructions that when executed by at least the processor cause the processor to:
  as a result of an instruction to open the network-accessible content at the network address, request a second hash of the network accessible content from a server hosting the network accessible content,
  in response to receiving the second hash, attempt to validate the second hash with the blockchain, and
  control opening the network-accessible content based on a result of the attempt to validate the second hash.

9. The computing system of claim 8, wherein the result of the attempt to validate the second hash includes a validation notice from the blockchain, the computing system further comprising a content validation module stored on the one or more non-transitory computer readable media and including instructions that when executed by at least the processor cause the processor to:
  once the validation notice is received, request the network-accessible content from the server;
  upon receiving the network-accessible content, compare the received network-accessible content to the hash received from the blockchain; and
  control opening the network-accessible content based on a result of the comparison.

10. The computing system of claim 8, wherein the encryption module further includes instructions that when executed by at least the processor cause:
  the terminal associated with the registrar to control inclusion of the hashed code in the blockchain record by transmitting the hashed code to the blockchain if the attempt to validate the authenticity of the hashed code results in a determination that the hashed code is authentic;
  the blockchain to transmit a domain confirmation request to a domain name server;
  the domain name server to: (i) determine whether the registrar matches a specific registrar linked to the domain in a data structure accessible to the domain name server, (ii) transmit an approval to the blockchain, to cause the hashed code to be included in the blockchain record as a result of a match between the registrar and the specific registrar, and (iii) transmit an objection to the blockchain, to interfere with inclusion of the hashed code in the blockchain record as a result of a determination that the registrar does not match the specific registrar; and
  the computing system to receive, by at least the processor, notification that the hashed code has been validated for inclusion in the blockchain record as a result of the match between the registrar and the specific registrar.

11. The computing system of claim 8, wherein the terminal associated with the registrar attempts to validate the authenticity of the hashed code by determining whether a signature of the encrypted and signed hash corresponds to a party affiliated with the domain.

12. The computing system of claim 8, wherein the terminal associated with the registrar interferes with inclusion of the hashed code in the blockchain record if the attempt to validate the authenticity of the hashed code fails, and the hashed code is not validated as being authentic.

13. The computing system of claim 12, wherein the hashed code is not validated if an encryption of the encrypted and signed hash is improper.

14. The computing system of claim 12, wherein the hashed code is not validated if a signature provided to the encrypted and signed hash is not a signature corresponding to a party affiliated with the domain.

15. A computer-implemented method, the method comprising:
  hashing, by at least a processor, computer code corresponding to network-accessible content to generate a hashed code, wherein the network-accessible content is to be hosted at a network address corresponding to a domain;
  encrypting and signing, by at least the processor, the hashed code to generate an encrypted and signed hash, wherein the hashed code is encrypted using: (i) a private key associated with a source of the network-accessible content, and (ii) a public key associated with a registrar of the domain;
  transmitting, by at least the processor, the encrypted and signed hash and the domain to a blockchain, causing:
    the blockchain to request validation the encrypted and signed hash by a terminal associated with a registrar of the domain; and
    (ii) the terminal associated with the registrar to: (a) decrypt the encrypted and signed hash using the private key to obtain the hashed code, (b) attempt to validate an authenticity of the hashed code, and (c) control inclusion of the hashed code in a blockchain record based on a result of the attempt to validate the authenticity of the hashed code; and
  in response to a user terminal attempting to access the network-accessible content at the network address, before opening the network-accessible content in the user terminal,
    generating, by a web server hosting the network-accessible content at the network address, a second hashed code of the network-accessible content, and
    preventing the user terminal from opening the network accessible content in response to a failed attempt to validate the second hashed code against the hashed code in the blockchain record.

16. The method of claim 15, wherein transmitting the encrypted and signed hash and the domain to a blockchain further causes:
  the terminal associated with the registrar to control inclusion of the hashed code in the blockchain record by transmitting the hashed code to the blockchain if the attempt to validate the authenticity of the hashed code results in a determination that the hashed code is authentic;

the blockchain to transmit a domain confirmation request to a domain name server; and the domain name server to: (i) determine whether the registrar matches a specific registrar linked to the domain in a data structure accessible to the domain name server, (ii) transmit an approval to the blockchain, to cause the hashed code to be included in the blockchain record as a result of a match between the registrar and the specific registrar, and (iii) transmit an objection to the blockchain, to interfere with inclusion of the hashed code in the blockchain record as a result of a determination that the registrar does not match the specific registrar.

17. The method of claim 16 further comprising:

receiving, by at least the processor, notification that the hashed code has been validated for inclusion in the blockchain record as a result of the match between the registrar and the specific registrar.

18. The method of claim 15, wherein transmitting the encrypted and signed hash and the domain to a blockchain causes the terminal associated with the registrar to attempt to validate the authenticity of the hashed code by determining whether a signature of the encrypted and signed hash corresponds to a party affiliated with the domain.

19. The method of claim 15, wherein transmitting the encrypted and signed hash and the domain to a blockchain causes the terminal associated with the registrar to interfere with inclusion of the hashed code in the blockchain record if the attempt to validate the authenticity of the hashed code fails, and the hashed code is not validated as being authentic.

20. The method of claim 15, wherein the hashed code is not validated if an encryption of the encrypted and signed hash is improper, or if a signature provided to the encrypted and signed hash is not a signature corresponding to a party affiliated with the domain.

\* \* \* \* \*

UNITED STATES PATENT AND TRADEMARK OFFICE
CERTIFICATE OF CORRECTION

PATENT NO. : 11,997,210 B2
APPLICATION NO. : 17/465036
DATED : May 28, 2024
INVENTOR(S) : Bueno It is certified that error appears in the above-identified patent and that said Letters Patent is hereby corrected as shown below:

In the Specification

In Column 2, Line 36, delete "disclosed" and insert -- disclosed. --, therefor.

In the Claims

In Column 18, Line 41, in Claim 15, delete "the" and insert -- (i) the --, therefor.

Signed and Sealed this
Eighth Day of October, 2024

*Katherine Kelly Vidal*
Katherine Kelly Vidal
*Director of the United States Patent and Trademark Office*